(12) United States Patent
Mangiacotti et al.

(10) Patent No.: US 10,010,831 B2
(45) Date of Patent: Jul. 3, 2018

(54) LARGE VOLUME DISPOSABLE ULTRAFILTRATION SYSTEMS AND METHODS

(75) Inventors: Scott A. Mangiacotti, Harvard, MA (US); Parrish M. Galliher, Littleton, MA (US); Joseph J. Arduino, Northborough, MA (US); Michael Fisher, Ashland, MA (US); John J. Vicalvi, Jr., Shrewsbury, MA (US); Joseph Makowiecki, Oxford, MA (US)

(73) Assignee: GE HEALTHCARE BIO-SCIENCES CORP., Piscataway, NJ (US)

( * ) Notice: Subject to any disclaimer, the term of this patent is extended or adjusted under 35 U.S.C. 154(b) by 584 days.

(21) Appl. No.: 13/879,354

(22) PCT Filed: Oct. 14, 2011

(86) PCT No.: PCT/US2011/056333
§ 371 (c)(1),
(2), (4) Date: Apr. 12, 2013

(87) PCT Pub. No.: WO2012/051517
PCT Pub. Date: Apr. 19, 2012

(65) Prior Publication Data
US 2013/0200005 A1    Aug. 8, 2013

Related U.S. Application Data

(60) Provisional application No. 61/393,613, filed on Oct. 15, 2010.

(51) Int. Cl.
*B01D 35/00*    (2006.01)
*B01D 61/22*    (2006.01)
(Continued)

(52) U.S. Cl.
CPC ........... *B01D 61/22* (2013.01); *B01D 61/145* (2013.01); *C02F 1/444* (2013.01);
(Continued)

(58) Field of Classification Search
None
See application file for complete search history.

(56) References Cited

U.S. PATENT DOCUMENTS 3,853,756 A * 12/1974 Stana .............................. 210/636
4,332,719 A *  6/1982 Lawhon et al. ............... 530/377
(Continued)

FOREIGN PATENT DOCUMENTS

CN         1219138 A     6/1999
CN       101022875 A     8/2007
(Continued)

OTHER PUBLICATIONS

Chinese Office Action dated Jul. 13, 2015 for Application No. CN 201180049731.X.
(Continued)

*Primary Examiner* — Richard C Gurtowski
(74) *Attorney, Agent, or Firm* — Grogan, Tuccillo & Vanderleeden, LLP

(57) ABSTRACT

A disposable filtration system can include a disposable filter housing having an ultrafiltration filter contained therein. The disposable filtration system can further include a feed inlet and retentate outlet in fluid communication on one side of the filter and a permeate conduit on the other side of the filter for withdrawing permeate that passes through the filter. The system can include at least one disposable pressure control valve in fluid communication with either the retentate outlet or the permeate conduit and configured to regulate the pressure within the housing.

20 Claims, 2 Drawing Sheets

(51) Int. Cl.
  *B01D 61/14* (2006.01)
  *C02F 1/44* (2006.01)
(52) U.S. Cl.
  CPC ...... *B01D 2311/08* (2013.01); *B01D 2311/25* (2013.01); *B01D 2313/18* (2013.01); *B01D 2313/20* (2013.01); *B01D 2313/243* (2013.01); *B01D 2313/58* (2013.01); *B01D 2315/16* (2013.01); *B01D 2317/08* (2013.01); *B01D 2319/06* (2013.01); *C02F 2209/005* (2013.01); *C02F 2209/02* (2013.01); *C02F 2209/03* (2013.01); *C02F 2209/05* (2013.01); *C02F 2209/11* (2013.01); *C02F 2209/40* (2013.01)

(56) References Cited

U.S. PATENT DOCUMENTS

| | | | |
|---|---|---|---|
| 4,479,762 A | | 10/1984 | Bilstad |
| 4,708,790 A | * | 11/1987 | Bray ................ 210/87 |
| 4,894,149 A | * | 1/1990 | Block ............ 210/101 |
| 5,460,720 A | * | 10/1995 | Schneider ........ 210/321.86 |
| 5,814,311 A | | 9/1998 | Le Bras-Roulier |
| 6,267,875 B1 | | 7/2001 | Leo |
| 6,613,231 B1 | * | 9/2003 | Jitariouk .......... B01D 63/16 210/321.69 |
| 7,524,420 B2 | | 4/2009 | Radunsky et al. |
| 2002/0151804 A1 | | 10/2002 | O'Mahony |
| 2003/0230521 A1 | | 12/2003 | Schick |
| 2005/0023194 A1 | | 2/2005 | Peterson et al. |
| 2008/0269468 A1 | | 10/2008 | Vogel et al. |
| 2010/0190965 A1 | | 7/2010 | Yamaguchi et al. |

FOREIGN PATENT DOCUMENTS

| | | |
|---|---|---|
| EP | 1154827 | 11/2001 |
| EP | 1 154 827 | 10/2006 |
| EP | 1154827 B1 | 10/2006 |
| EP | 1775000 A2 | 4/2007 |
| EP | 2119492 A1 | 11/2009 |
| JP | 60-500159 | 2/1985 |
| JP | 10-066836 | 6/1998 |
| JP | 2001-504384 | 4/2001 |
| JP | 2005-007365 | 1/2005 |
| JP | 2005-505405 | 2/2005 |
| JP | 2005-523128 | 8/2005 |
| JP | 2009-262021 | 11/2009 |
| WO | 8402473 A1 | 7/1984 |
| WO | WO 1984/002473 | 7/1984 |
| WO | 97/44114 A1 | 11/1997 |
| WO | 2006/026253 A3 | 3/2006 |
| WO | 2011040405 | 4/2011 |
| WO | 2011091248 A1 | 7/2011 |

OTHER PUBLICATIONS

Chinese Search Report Jul. 2, 2015 for Application No. 13879354.
Japanese Office Action dated Aug. 4, 2015 for Japanese Patent Application No. 2013-534030.
EP Search Report dated Jul. 29, 2016.
Angelo Depalma, Bright Sky for Single-Use Bioprocess Products Acceptance of Disposable Products is Growing, Gen, Genetic Engineering & Biotechnology News, vol. 26, No. 3 Feb. 1, 2016, XP002760049, Retrived From the Internet: URL:http://www.genengnews.com/gen-articles/bright-sky-for-single-use-bioprocess-products/1319/.

* cited by examiner

LARGE VOLUME DISPOSABLE ULTRAFILTRATION SYSTEMS AND METHODS

RELATED APPLICATIONS

This application is a filing under 35 U.S.C. 371 of international application number PCT/US2011/056333, filed Oct. 14, 2011, published on Apr. 19, 2012 as WO 2012/051517, which claims priority to U.S. Provisional Patent Application No. 61/393,613 filed Oct. 15, 2010, the teachings of which are herein incorporated by reference in their entirety.

FIELD OF THE INVENTION

The present invention relates generally to filtration systems and methods, and in some embodiments, specifically to ultrafiltration, diafiltration, and tangential flow filtration systems and methods.

BACKGROUND OF THE INVENTION

Filtration is an essential unit operation in the production of many chemical and biological molecules, such as pharmaceuticals. The efficiency of filtration affects the amount of product recovered and can impede the scale-up of many reactor systems, such as perfusion bioreactors.

In Tangential Flow Filtration (TFF) systems, the fluid to be filtered is caused to flow under pressure in a direction generally normal to the filter surface area to force a portion of the flowing fluid through the filter. Rather than clogging the filter, retained particles that do not pass through the filter are carried along by the tangential flow. Although such devices do not generally have a clogging problem, the tangential flow filtration devices require large amounts of area, high flow rates, and high pressures, which may damage a desired component of the fluid. Even in TFF systems, the filtration system must be thoroughly cleaned between uses, a time-consuming and expensive operation to prevent system contamination.

Accordingly, there is need for a large volume disposable ultrafiltration systems, and methods of performing filtration, that reduce cleaning time and allow a flexible system volume.

SUMMARY OF THE INVENTION

Disposable filtration systems and methods are disclosed that employ a disposable filter housing having an ultrafiltration filter contained therein. The disposable filtration systems can further include a feed inlet and retentate outlet in fluid communication on one side of the filter and a permeate conduit on the other side of the filter for withdrawing permeate that passes through the filter. The system can include at least one disposable pressure control valve in fluid communication with either the retentate outlet or the permeate conduit and can be configured to regulate the pressure within the housing.

The filter can be a tubular membrane filter disposed within the housing such that the fluid path is between an inner tube disposed concentrically within an outer tube and having an interior of the inner tube, an exterior of the inner tube, at least one inner tube inlet, and at least one inner tube outlet, wherein the inner tube is configured to allow a permeate to pass from the interior of the inner tube to the exterior of the inner tube.

In one embodiment the disposable filtration system comprises a flat sheet type membrane.

The systems according to various embodiments are scalable. A single device can be used to filter, for example, from about 10 liters to about 3,000 liters of fluid or more in a single use batch run. The disposable filtration system can include one or more filter assemblies or tube sets configured to provide a filter surface area from about 1.0 meter$^2$ to about 50 meters$^2$, or from about 2 meters$^2$ to about 30 meters$^2$, or from about 2.5 to about 20 meters$^2$. The disposable filtration system can also be configured to allow a change in flow path.

The disposable filtration system can further include at least one system controller and at least one disposable sensor operably coupled to the disposable filtration system and the at least one system controller. The at least one disposable sensor can include a pressure sensor, conductivity sensor, temperature sensor, a flow sensor, an ultraviolet or UV sensor, a turbidity sensor, and combinations thereof. The at least one system controller can be a programmable logic controller containing a plurality of proportional-integral-derivative controllers.

The disposable filtration system can include a retentate reservoir having at least one inlet connected to the at least one inner tube outlet and at least one outlet connected to the at least one inner tube inlet and can further include a permeate reservoir having at least one inlet connected to the at least one outer tube outlet. The system can include at least one non-pulsating pump having a disposable filter head operably connected to move fluid through the disposable filtration system. The at least one tube set can have two symmetric tube sets connected in parallel and adjustably configured to accommodate varying flow rates. The disposable filtration system can be a tangential flow filtration system.

A method of filtering a fluid can include pumping a fluid through a disposable filter assembly and controlling at least a pressure within the filter assembly with a disposable pressure control valve that is operably coupled to a system controller. The filter assembly can be a tubular membrane filter disposed within the housing such that the fluid path between an inner tube disposed concentrically within an outer tube and having an interior of the inner tube, an exterior of the inner tube, at least one inner tube inlet, and at least one inner tube outlet, wherein the inner tube is configured to allow a permeate to pass from the interior of the inner tube to the exterior of the inner tube. The filter assembly can have a filter area of at least about 20 square meters. In another embodiment of the disclosed method, the filter comprises a flat sheet type membrane.

Furthermore, the system controller can be a programmable logic controller containing multiple proportional-integral-derivative controllers that control the trans-membrane pressure. The method can also include recycling at least a portion of a retentate stream from an outlet of the filter assembly to an inlet of the filter assembly.

A disposable filtration kit can include at least one disposable filtration assembly, and at least one disposable pressure control valve. The disposable filtration kit can further include at least one disposable pump head and at least one disposable sensor. The disposable filtration kit can include at least one disposable reservoir. The disposable filtration kit can include at least one disposable tube or piping element.

BRIEF DESCRIPTION OF THE DRAWINGS

The foregoing and other objects, features and advantages of the invention will be apparent from the following more particular description of illustrative embodiments of the invention, as illustrated in the accompanying drawings in which like reference characters refer to the same parts throughout the different views. The drawings are not necessarily to scale, emphasis instead being placed upon illustrating the principles of the invention. Those skilled in the art will understand that the devices and methods specifically described herein and illustrated in the accompanying drawings are non-limiting exemplary embodiments. The features illustrated or described in connection with one exemplary embodiment can be combined with the features of other embodiments. Such modifications and variations are intended to be included within the scope of the present invention.

DETAILED DESCRIPTION OF THE INVENTION

Figure 1:
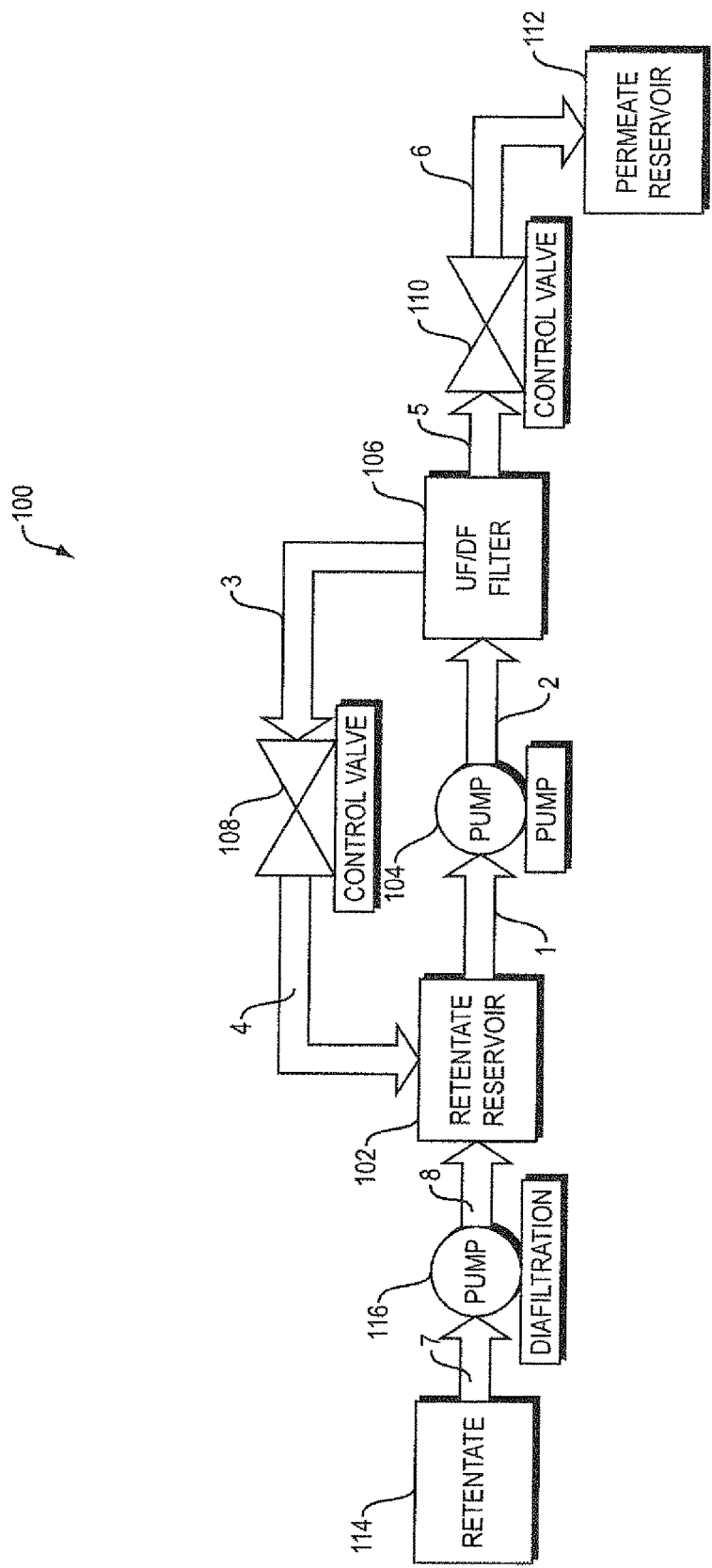
FIG. 1 is a block diagram of a filtration system according to the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The term "ultrafiltration" or "UF" as used herein is intended to encompass separation of particles from a suspension or solution by passage through a filter with very fine pores. Ultrafiltration is filtration through a very fine porous medium or membrane (e.g., a semipermeable tube wall) which allows small molecules (e.g., water) to pass but holds back larger ones (as of protein). The term "diafiltration" or "DF" is used interchangeably with "ultrafiltration" or "UF" throughout the present specification except where a different meaning is required. Typically, diafiltration is a form of ultrafiltration where the objective is to remove salts, small molecules or other microsolutes from a solution.

"Tangential flow filtration" or "TFF" or "crossflow filtration" refers to filtration processes in which the sample mixture circulates along the surface of the porous medium or membrane, while applied pressure causes certain solutes and small molecules to pass through the filter. Typically, the solution flows parallel or tangential to the filter medium or membrane. A pressure differential across the membrane causes fluid and filterable solutes to flow through the filter. This can be conducted as a continuous-flow process, since the solution is passed repeatedly over the membrane while that fluid that passes through the filter is continually drawn off into a permeate stream.

An ultra filtration/diafiltration (UF/DF) system embodiment can include a number of advantages over prior systems. In particular, this embodiment of the system has the main advantage of being inherently scalable and configurable to run both a low volume of material as well as a high volume of material. A change from high to low volume can be accomplished with a change in the flow path. In addition, an embodiment of the UF/DF system can include the advantages of: 1) using a high volume pump that has a disposable pumping head, 2) including pumps that are non-pulsating that help protect molecule viability/stability, 3) embedded software that allows for automating start/stop, 4) having a capacity for 20 square meters of disposable filter area or more, and 5) flexibility with a tube-set design that is symmetrical to allow as little as 2.5 square meters of filter with installation of only one-half of the disposable tube-set including single use sensors and single use control valves as part of the tube-set.

One embodiment of the UF/DF system can include ultra filtration/diafiltration or tangential flow filtration. This can be used to reduce batch volumes by changing concentrations and enabling efficient column operation or final formulation of a product.

An embodiment of the invention can have a disposable product-contact flowpath, thereby eliminating the need for cleaning the system between runs.

FIG. 1 is a block diagram showing the general arrangement of an embodiment of a UF/DF system. In this embodiment, the UF/DF system's 100 objective is to purify, separate, and concentrate target macromolecules. The components that do not pass through the system are known as retentate whereas the solvent and dissolved components that do pass through the system are known as permeate.

The UF/DF system 100 includes a retentate reservoir 102 that feeds retentate via line 1 into a feed pump 104. The pump 104 feeds the retentate into a UF/DF filter 106 via line 2. The feed pump 104 forces the retentate tangentially along the surface of the filter membrane. Pressure is applied to force a portion of the fluid through this membrane to the permeate side of the filter 106. The particulates and macromolecules that are too large to pass through the filter's membrane pores are retained on the upstream side. The retained components do not build up at the surface of the filter membrane due to the flow being tangent to the filter.

The retained components are moved along by the tangential flow into a control valve 108 via line 3. The control valve 108 can be set to provide a controlled back pressure for the UF/DF filter 106. From the control valve 108, the components are fed back into the retentate reservoir 102 via line 4 to be cycled back through the UF/DF filter 106.

The filtered substance or permeate that passed through the UF/DF filter 106 flows into a control valve 110 via line 5. The control valve 110 on the permeate side is also used to control the backpressure. From the control valve 110, the permeate outputs into a permeate reservoir 112 via line 6.

In one embodiment, the UF/DF system 100 further includes an initial step of feeding retentate 114 into a diafiltration pump 116 via line 7 where fresh solvent is added to the retentate within pump 116 in order to dissolve some of the components in the retentate. This new retentate fluid is pumped into the retentate reservoir 102 via line 8.

In one embodiment, the UF/DF filter 106 includes a disposable filter housing. The disposable filter housing can be a tubular membrane filter. In this embodiment, the tubular membrane filter is disposed within the housing such that the fluid path is between an inner tube disposed concentrically within an outer tube and having an interior of the inner tube, an exterior of the inner tube, at least one inner tube inlet, and at least one inner tube outlet, wherein the inner tube is configured to allow a permeate to pass from the interior of the inner tube to the exterior of the inner tube. In certain embodiments, the inner tube can be comprised of materials known to those skilled in the art to provide size-exclusion filtration, such as ceramics, PTFE membranes, and microfibers. The porosity and tortuosity of the tubular membrane filter may be varied by one skilled in the art to provide the appropriate filter material for a desired fluid.

Figure 2:
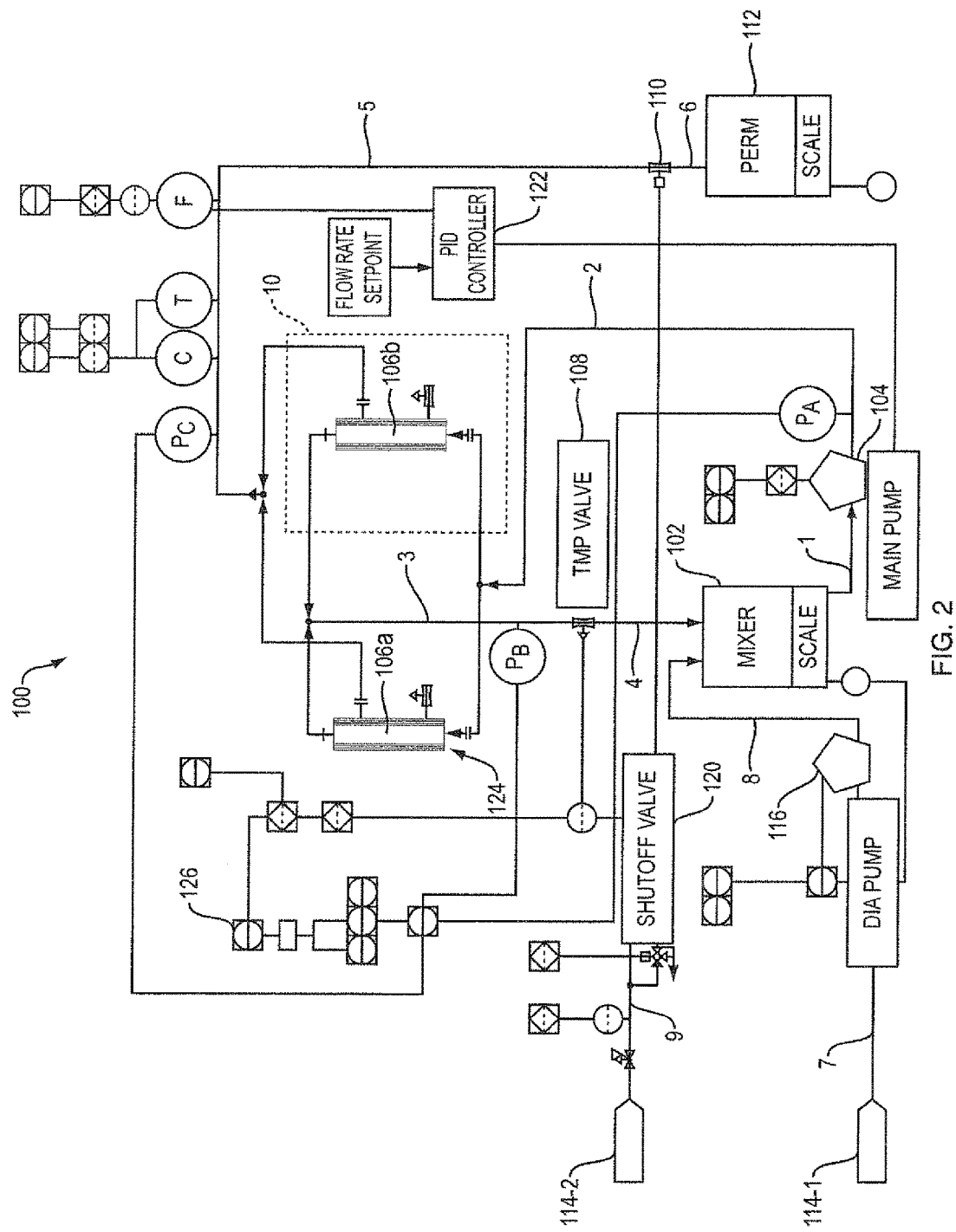
FIG. 2 is a schematic diagram of a filtration system according to the invention.

Diafiltration can include the process of exchanging buffers. In certain embodiments, it may be desirable to exchange one buffer material with another, as a person having ordinary skill in the art will understand. FIG. 2 is a schematic diagram showing the UF/DF system 100 in a specific embodiment. A buffer addition and/or exchange port or reservoir 114-1 may feed a liquid to a diafiltration pump 116 via line 7. The diafiltration pump 116 is preferably a non-pulsating disposable head pump. The diafiltration pump 116 feeds the buffer into a retentate reservoir or vessel 102 via line 8. The new buffer is supplied at 114-1. The retentate reservoir 102 can comprise a disposable vessel such as a collapsible plastic bag, a glass container, or a stainless steel container.

The diafiltration pump 116 can include a disposable pump-head. This can include any portion of the pump that comes into contact with the fluid to be filtered, or any component thereof. The diafiltration pump 116 can comprise any pumping method known to those skilled in the art, including but not limited to peristaltic pumps and pneumatic pumps. The disposable head can comprise any material known to be non-reactive to the fluid to be filtered.

This system 100 also includes a compressed air port 114-2. This is introduced via line 9 into a shutoff valve 120. This pneumatic supply is used to power the TMP valve 108 and permeate control valve 110.

The retentate vessel 102 can include a disposable mixer component for agitating the retentate and a scale component for monitoring the amount of retentate in the vessel 102. The mixer component further includes a temperature control system, in the current embodiment. The substance within the retentate vessel 102 is supplied into a feed pump 104 or main pump via line 1. In one example, the main pump is a non-pulsating disposable head pump. In the FIG. 2 embodiment, the main pump 104 is controlled with a proportional, integral, derivative (PID) controller 122 to maintain a user selected flow rate (liters/minute) at the disposable flow sensor F later in the system.

The main pump 104 forces the retentate along line 2 past a pressure sensor $P_A$ into the UF/DF filter component 124. The pressure sensor $P_A$ is preferably disposable.

The UF/DF filter component 124 splits the feed line so that the retentate flows through two disposable UF/DF filters 106A, 106B in parallel. The filters 106A, 106B are preferably cartridge filters or hollow fiber filters.

The parallel filter configuration is converted to a single filter line for a low-volume application. In the low-volume embodiment, the section surrounded by dotted box 10 is removed so that retentate is fed directly from the main pump 104 via line 2 directly into a single UF/DF filter 106A.

The retentate is directed tangent to each UF/DF filter 106 so that the unfiltered retentate flows from the filters 106A, 106B past a pressure sensor $P_B$ to a control valve 108 via line 3. The pressure sensor $P_B$ is also preferably disposable. The control valve 108 is usually a disposable trans-membrane pressure (TMP) valve. In one example, the TMP valve 108 is an arterial modulating process valve that modulates the flow of the fluids in order to maintain system efficiency and a desired level of back pressure. The TMP valve directs the unfiltered retentate back to the retentate vessel 102 via line 4.

The retentate that is filtered by the UF/DF filters 106A, 106B is a permeate substance. The permeate substance flows along line 5 past a number of sensors before entering a permeate control valve 110. The sensors include a pressure sensor $P_C$, conductivity sensor C, temperature sensor T, and an ultrasonic flow sensor F. These sensors can also be disposable. The permeate disposable control valve 110 can be a pinch on/off valve type in one example and is used to control back pressure from the permeate side. The permeate passes through the permeate valve 110 into a permeate reservoir or permeate vessel 112 via line 6. This permeate vessel 112 preferably includes a temperature controlled disposable mixing system and scale or a disposable mixing system on load cells.

The UF/DF system 100 optionally includes an ultra-violet sensor (not shown) that is also disposable. This sensor is used for monitoring the system after it starts to detect when a run is completed.

The TMP valve 108 is controlled with a proportional-integral-derivative (PID) controller 126. The PID is trans-membrane pressure which is calculated as:

$$[(P_A+P_C)/2]-P_B \tag{1}$$

The TMP valve 108 is controlled to maintain a user selected TMP setpoint preferably with a programmable logic controller.

The user interface, trending and alarming system may be a Human Machine Interface (HMI) and Supervisory Control and Data Acquisition (SCADA) system.

This UF/DF system includes an automated start process and automated stop process that is accomplished with a number of steps.

For the automated start process, the initial steps include opening the TMP Valve 108 to 100%, opening the permeate valve 110, starting the main pump 104 in manual, and waiting until the system 100 is filled with liquid and the flow rate as detected by sensor F and possibly other flow sensors is constant.

Then, the process includes the steps of putting the main pump 104 in automatic with a predefined recipe driven flow rate setpoint and then waiting for the main pump flow rate to stabilize at or near the setpoint. The next step is putting the TMP valve 108 into automatic with a predefined recipe driven TMP pressure setpoint and waiting for the recipe target ultra violet sensor value to be met.

For the automated stop process, the TMP valve 108 is opened to 100% and the main pump 104 is stopped in manual. Then, the stop process includes the step of waiting until the main pump 104 is stopped and the flow rate is at zero as detected by flow sensor F and possibly other flow sensors. The final steps include closing the TMP valve 108 and closing the permeate valve 110. The ultraviolet sensor may be incorporated to initiate the automated stop.

Some embodiments of the disclosed system and method are useful for upstream or downstream processing in biological or biopharmaceutical manufacturing, and can be used to concentrate biomolecules and particulates.

While this invention has been particularly shown and described with references to preferred embodiments thereof, it will be understood by those skilled in the art that various changes in form and details may be made therein without departing from the scope of the invention. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

The invention claimed is:

1. A disposable filtration system, comprising:
a filter component having two disposable ultrafiltration filters fluidly connected in a parallel flow path such that the filter component is adjustable from a high volume configuration to a low volume configuration by disconnecting at least one of the disposable ultrafiltration filters from the parallel flow path, the filter component further comprising a feed inlet and retentate outlet in fluid communication on one side of the parallel flow path and a single permeate conduit on the other side of the parallel flow path for withdrawing permeate that passes through the parallel flow path;
at first disposable pressure control modulating valve in fluid communication with the retentate outlet and configured to regulate pressure within the filter component;
a second disposable pressure control modulating valve in fluid communication with the permeate conduit and configured to regulate pressure within the filter component;
a disposable feed pressure sensor operably coupled to the feed inlet;
a retentate pressure sensor located intermediate the filter component and the first disposable pressure control modulating valve and operably coupled to the retentate outlet;
a permeate pressure sensor along the permeate conduit and located intermediate the filter component and the second disposable pressure control modulating valve; and
wherein the retentate pressure sensor and the permeate pressure sensor are operative to provide an indication of the pressure within the filter component, and
at least one system controller operably coupled to the first disposable pressure control modulating valve, the second disposable pressure control modulating valve, the feed pressure sensor, the retentate pressure sensor and the permeate pressure sensor, the at least one system controller configured to control the first disposable pressure control modulating valve and the second disposable pressure control modulating valve using information from the feed pressure sensor, the retentate pressure sensor and the permeate pressure sensor, the information based at least in part on the indication of the pressure within the filter component.

2. The disposable filtration system of claim 1, wherein at least one of the two disposable ultrafiltration filters comprises a tubular membrane filter disposed within the filter component such that the fluid path is between an inner tube disposed concentrically within an outer tube and having an interior of the inner tube, an exterior of the inner tube, at least one inner tube inlet, and at least one inner tube outlet, wherein the inner tube is configured to allow a permeate to pass from the interior of the inner tube to the exterior of the inner tube.

3. The disposable filtration system of claim 1, wherein at least one of the two disposable ultrafiltration filters comprises a flat sheet type membrane.

4. The disposable filtration system of claim 1, wherein the disposable filtration system comprises a tangential flow filtration system.

5. The disposable filtration system of claim 1, wherein at least one of the two disposable ultrafiltration filters comprises at least about 2.5 square meters of filter area.

6. The disposable filtration system of claim 1, wherein at least one of the two disposable ultrafiltration filters provides a filter surface area from about 1.0 $meter^2$ to about 50 meters.

7. The disposable filtration system of claim 1, wherein the disposable filtration system is configured to allow a change in flow path.

8. The disposable filtration system of claim 1, further comprising a retentate reservoir having at least one inlet in fluid communication with the retentate outlet of the filter component and at least one outlet in fluid communication with the feed inlet of the filter component.

9. The disposable filtration system of claim 1, further comprising: a permeate reservoir having at least one inlet in fluid communication with the permeate conduit of the filter component.

10. The disposable filtration system of claim 1, further comprising: at least one non-pulsating pump having a disposable pump head operably connected to move fluid through the disposable filtration system.

11. The disposable filtration system of claim 1, further comprising:
at least one of a conductivity sensor, a temperature sensor and a flow sensor located intermediate the filter component and the second disposable pressure control modulating valve.

12. The disposable filtration system of claim 1, further comprising:
a conductivity sensor, a temperature sensor, a flow sensor, an ultraviolet sensor, and a turbidity sensor.

13. The disposable filtration system of claim 1, wherein the at least one system controller comprises a programmable logic controller containing a plurality of proportional-integral-derivative controllers.

14. A method of filtering a fluid, comprising:
pumping a fluid through a filter component having two disposable ultrafiltration filters contained therein and fluidly connected in a parallel flow path such that the filter component is adjustable from a high volume configuration to a low volume configuration by disconnecting at least one of the disposable ultrafiltration filters from the parallel flow path, the filter component further comprising a feed inlet and retentate outlet in fluid communication on one side of the parallel flow path and a permeate conduit on the other side of the parallel flow path for withdrawing permeate that passes through the parallel flow path; and
controlling at least a pressure within the filter component with a first disposable pressure control modulating valve and a second disposable pressure control modulating valve that are each operably coupled to a system controller using information from a plurality of disposable sensors including a feed pressure sensor operably coupled to the feed inlet, a retentate pressure sensor located intermediate the filter component and the first disposable pressure control modulating valve and operably coupled to the retentate outlet, and a permeate pressure sensor operably coupled to the permeate conduit intermediate the filter component and the second disposable pressure control modulating valve; and wherein the retentate pressure sensor and the permeate pressure sensor are operative to provide an indication of pressure within the filter component and the information is based at least in part on the indication of the pressure within the filter component.

15. The method filtering of claim 14, wherein at least one of the two disposable ultrafiltration filters provides a filter surface area from about 1.0 meter$^2$ to about 50 meters$^2$.

16. The method filtering of claim 14, wherein the system controller is a programmable logic controller containing a plurality of proportional-integral-derivative controllers.

17. The method filtering of claim 16, wherein at least one of the plurality of proportional-integral-derivative controllers controls trans-membrane pressure.

18. The method filtering of claim 14, further comprising recycling at least a portion of a retentate stream from an outlet of the filter component to an inlet of the filter component.

19. A disposable filtration kit, comprising:

at least one disposable filtration assembly comprising a filter component and two disposable ultrafiltration filters contained therein and fluidly connected in a parallel flow path such that the filter component is adjustable from a high volume configuration to a low volume configuration by disconnecting at least one of the disposable ultrafiltration filters from the parallel flow path, the filter component further comprising a feed inlet and retentate outlet in fluid communication on one side of the parallel flow path and a permeate conduit on the other side of the parallel flow path for withdrawing permeate that passes through the parallel flow path;

a first disposable pressure control modulating valve configured for fluid coupling with the retentate outlet and configured to be operably coupled to a system controller;

a second disposable pressure control modulating valve configured for fluid coupling with the permeate conduit and configured to be operably coupled to the system controller;

at least one disposable pump head;

a plurality of disposable sensors including a feed pressure sensor configured to be operably coupled to the feed inlet, a retentate pressure sensor configured to be operably coupled to the retentate outlet intermediate the filter component and the first disposable pressure control modulating valve, and a permeate pressure sensor configured to be operably coupled to the permeate conduit intermediate the filter component and the second disposable pressure control modulating valve, wherein the feed pressure sensor, the retentate pressure sensor and the permeate pressure sensor are further configured to be operably coupled to the system controller; and the system controller;

wherein the system controller is configured to control the first disposable pressure control modulating valve and the second disposable pressure control modulating valve using information from the feed pressure sensor, the retentate pressure sensor and the permeate pressure sensor;

wherein the first and second disposable pressure control monitoring valves are configured to regulate the pressure within the filter component; and wherein the retentate pressure sensor and the permeate pressure sensor are operative to provide an indication of pressure within the filter component and the information is based at least in part on the indication of the pressure within the filter component.

20. The disposable filtration kit of claim 19, further comprising:

at least one disposable reservoir.

* * * * *